Sept. 26, 1967　　　A. E. R. ARNOT　　　3,343,692
MATERIALS HANDLING INSTALLATIONS
Filed Dec. 7, 1964　　　2 Sheets-Sheet 2
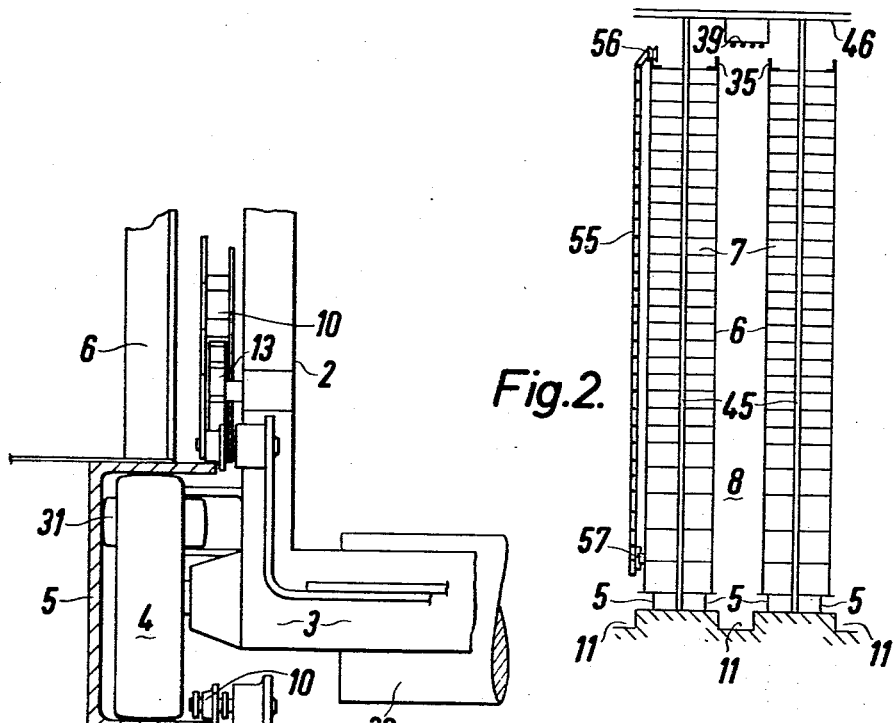
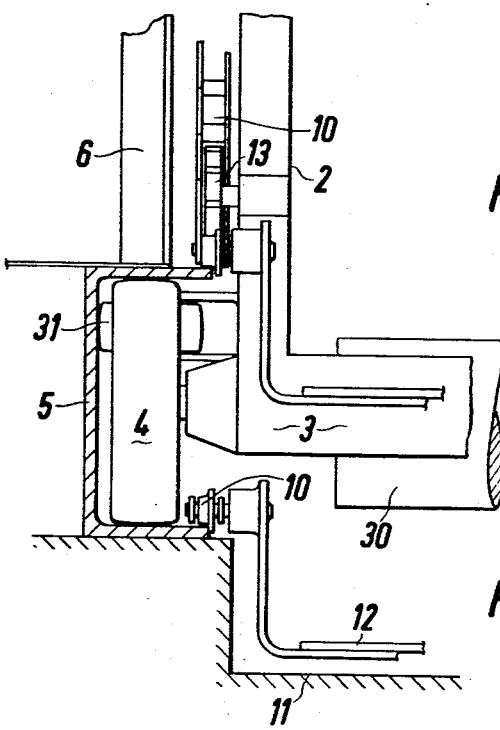
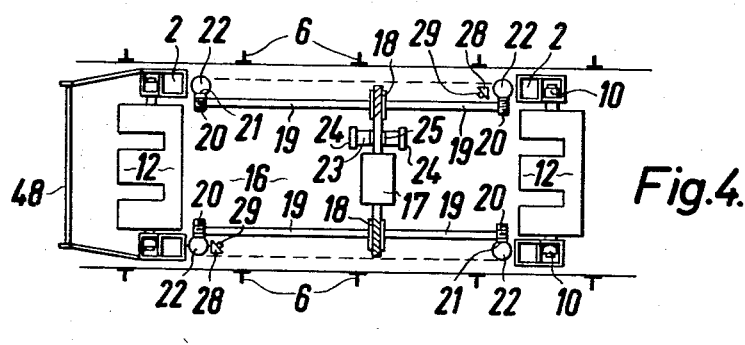
INVENTOR
A.E.R. ARNOT.

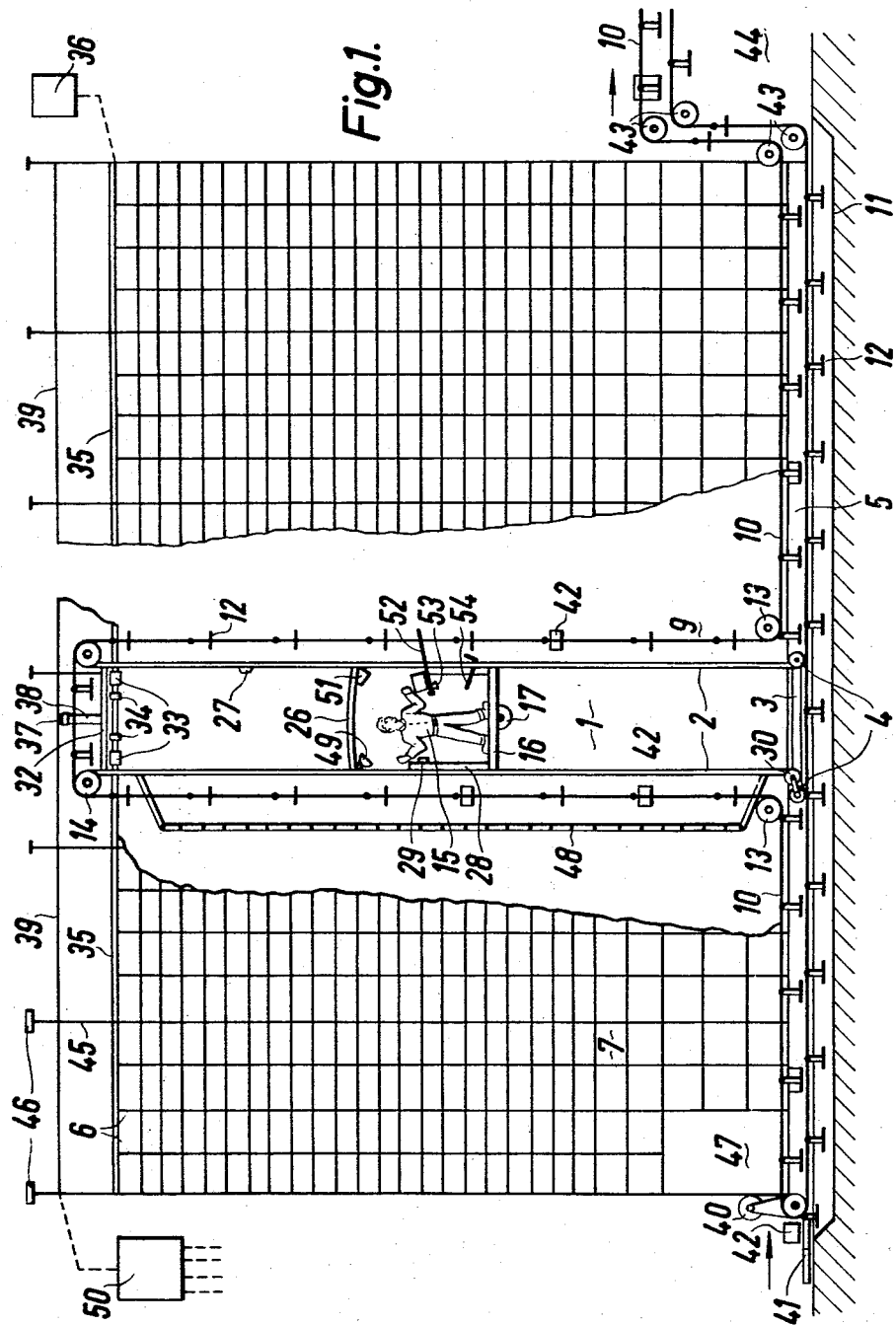

United States Patent Office 3,343,692
Patented Sept. 26, 1967

3,343,692
MATERIALS HANDLING INSTALLATIONS
Alfred Erwin Reginald Arnot, The Bell House,
Baughurst, Basingstoke, England
Filed Dec. 7, 1964, Ser. No. 416,657
7 Claims. (Cl. 214—16.4)

In the manufacture, storage and distribution of products the need to select individual orders from a vast and growing inventory of piece parts, and to replenish the stock, is presenting considerable problems. Systems have been evolved using free-running trucks amongst comparatively low racks, having operators standing on elevatable platforms; or guided trucks constrained to travel long distances in aisles with the goods to be replenished or which have been picked; or masts dependent from overhead rails, carrying operators in vertically movable gondolas between walls of racking; or the like. All have suffered from the over-riding disadvantage that the operator and vehicle lose a great deal of time in both horizontal and vertical travel when fetching stock for replenishing or taking away picked items, thereby limiting the number of items which can be covered by one operator and preventing attainment of the maximum economic height of building construction because of the low lifting speed associated with a full load of replenishing stock.

It is therefore an object of the present invention to provide an order-picking installation in which an operator may constantly traverse the working face of a storage rack without losing time in fetching or disposing of goods.

In accordance with this invention there is provided an order-picking installation comprising storage racking, guide means disposed longitudinally parallel to said racking and constraining a vehicle comprising a vertical structure and a load-handling carriage vertically movable in the structure, drive means operable to drive the vehicle along the guide means, conveyor means disposed longitudinally in the path of the vehicle and comprising a series of load carriers that pass continuously over said structure such that a load can be raised on a first side of the structure and lowered on a second side of the structure, means to transfer a load between a load carrier and the load-handling carriage, and means to transfer a load between the load-handling carriage and the storage racking.

Said storage racking may be erected along one or both sides of an aisle, and may extend from below or above a floor level; it may comprise compartments for small items or apertures for boxes or bins or rolls or reels or pallets or the like, or any combination thereof; and it may comprise load receiving or discharging means such as a tiltable roller platform, or automatically operable gate means.

Said vehicle may comprise any vertically movable load-handling carriage adapted to replenish goods into or take goods from said storage racking by manual means which may comprise a movable platform for an operator; or by operator or automatically controlled means which may comprise load handling means such as side-traversing or rotatable or elevatable forks, or platform or conveyor or chute or the like, operable by an operator travelling with said load or remote therefrom on or off said vehicle, or by automatic means such as a computer which may also be adapted to actuate and co-ordinate said vehicle travel and positioning, and goods releasing or admitting means on said racking.

The vehicle may be driven electrically or pneumatically or mechanically or otherwise, and the drive means may comprise driving wheels at the base or top or intermediately of the vehicle; or friction or magnetic gripping or clutch means in co-operation with cable or chain or shafting along the path of the vehicle constantly driven by stationary engine means; or by direct engagement with a chain or cable or rack or screw or splined shaft or the like along the path of the vehicle driven by a stationary engine manually or automatically controllable to move and operate the vehicle as required. A plurality of synchronised lifting means, in vertically disposed relationship may be provided to maintain accurate vertical alignment of the vehicle with the racking.

The vehicle may comprise elevating means which may be electrically or pneumatically or hydraulically driven by motor means mounted on the vehicle structure or on the load-handling carriage, and which may act on screw or rack or chain or other means to elevate the load or operator.

Said conveyor means may comprise any conveyor means suitable for carrying the load being handled, or any combination of conveyor means, and may convey loads to or from said vehicle by direct or load-transferring means, and may be charged and discharged by manual or automatic means at either end of the path of the vehicle where it may be elevated or lowered to pass above or beneath a cross-aisle.

Said guide means may comprise vertical or inclined surfaces adapted to constrain the vehicle in conjunction with sliding or rolling means on the vehicle which may be fixed or adjustable or spring-loaded to maintain clearance between the vehicle and racking; it may comprise any substantially supported continuous surface overlying a projection or roller or wheel or part of the structure of the vehicle to trap it against overturning; it may comprise a load-bearing surface for the wheels of the vehicle, and may be flat or concave or convex or V-form or rack geared, and may provide lateral restraint in one or both directions. The guide means may be secured onto or in the floor of an aisle, or onto or beneath or above or intermediately on or recessed in the racking alongside the aisle, or any combination thereof; and it may be insulated to comprise an electrical supply conductor to the vehicle in conjunction with current collector means thereon.

Electrical power supply to the vehicle may conveniently be at extra low tension A.C., normally not exceeding 30 volts r.m.s., supplied to collector lines by transformer from the supply mains. Control means for a D.C. motor on the vehicle may comprise a voltage-increasing transformer and semi-conductor controlled rectifier for supplying variable D.C. under operator or automatic control.

Positioning of the vehicle load-handling means relative to a selected racking aperture may be operator-adjusted by manipulation of speed-changing and braking controls; or push-button or dialled or otherwise registered numerical or other code may be set up by the operator or punched card order list or remote automatic means to cause the vehicle and load-handling means to seek a desired position. Conveniently the horizontal co-ordinate of travel may be accurately determined from the rotation of a toothed wheel on the vehicle engaging a continuous length of roller chain secured to the racking with a strict relationship between the number of pitches and the aperture position; whilst the vertical co-ordinate may be similarly accurately determined from the rotation of a toothed wheel on the load elevating carriage engaging a chain or rack parallel with or comprising the load elevating means. Automatic travel control may conveniently be based on a decade counter operating a reversing switch according to the lag or lead between a setting dial set to a desired co-ordinate by the operator, and a follower cam appropriately geared to the position-determining toothed wheel described above. Automatic retardation means may be selected at a pre-determined displacement between the setting dial and follower cam.

The following is a description by way of example of one construction in accordance with the invention, in which:

FIGURE 1 is a schematic longitudinal elevation of one aisle of an order-picking store according to the invention.

FIGURE 2 represents a transverse cross-section of the racking shown in FIG. 1.

FIGURE 3 illustrates on an enlarged scale the general inter-relation of the vehicle wheels, conveyor guide means and racking base in the embodiment of FIG. 1.

FIGURE 4 is a schematic plan view of the load-handling carriage elevating mechanism, showing also the vertical structure of the vehicle and conveyor guide means.

Referring first to FIG. 1, a vehicle 1 comprising four pillars 2 rising from a base 3, is carried by four wheels 4 running in channel guide 5 supporting the front pillars 6 of a wall of compartmented racking 7 on each side of an aisle 8.

A suspended tray conveyor 9 is carried along the base of the aisle 8 by flanged roller chain 10 running on the projecting horizontal flanges of channel 5, the floor of the aisle being provided with a trench 11 to permit return of the conveyor trays 12. Sprockets 13 mounted on the vehicle are arranged to deflect the conveyor chain 10 from its track on the upper flange of channel 5, whence it is led vertically to the top of the vehicle to pass over sprockets 14 and down again to be restored to its track on the channel 5 by sprockets 13 on the other side of the vehicle.

An operator 15 stands on a vertically movable platform 16, driven by an electric motor 17 through worm reduction gears 18 and cross-shafts 19 to pinions 20 meshing with rack faces 21 cut on shafts 22 which extend substantially from top to bottom of the vehicle 1. It is intended that the mechanical interconnection of the four driving pinions 20 shall maintain the level of the platform 16 despite displacement of the centre of gravity due to movement of the operator or collection of loads.

A brake drum 23 held by spring-applied shoes 24 is mounted by a back-stopping roller clutch 25 on the shaft of motor 17, which cannot therefore rotate to lower the platform until the brake is released by an operator control. A canopy 26 attached to platform 16 is provided to protect the operator and act as an ultimate upper stop, whilst a limit switch 27 is arranged to reduce the speed of lift before the platform reaches its maximum elevation. Control pillars 28 are provided at diagonally opposite corners of the platform, and push-buttons 29 are connected in each so that no movement of the vehicle or platform can occur unless the operator is pressing both at the same time, or using other diagonally opposite controls, and is therefore safely constrained in the centre of the platform 16.

The vehicle 1 is driven along the aisle by an electric motor 30 provided with a transmission brake, geared to the wheels 4 and controlled from the operator's platform. The vehicle is laterally guided by side rollers 31 carried on the vehicle and arranged to bear on the vertical web of the channel 5. A frame structure 32 at the top of the vehicle carries laterally stabilising side rollers 33, and electrical collector brushes 34 bearing on an insulated top rail 35 of the racking 7 on each side of the aisle, and connected to a mains transformer 36 providing 30 volts r.m.s. A.C. Telephone and remote control connections are established between collector brushes 37 carried on a frame 38 above the vehicle, and conductors 39 suspended above the aisle.

The conveyor 9 is driven by a stationary motor 40 at the end of the aisle, and remotely controlled from the operator's platform. The trays 12 are slotted for automatic loading from a comb 41 at the beginning of the aisle, and carry loads 42 to the operator. The output end of the conveyor is raised on sprockets 43 above the headroom in a gangway 44, whence it may off-load onto a perimeter conveyor or continue to a packing bay; the input end of the conveyor may be similarly raised or lowered or loaded at a distance.

The racking is provided with central columns 45 extending from the floor to an overhead cross-connecting structure 46 which serves to maintain the lateral stability of the racking and the accuracy of the aisle width, and may comprise or pass through the building roof trusses or form the base of an upper floor. An aperture 47 is provided in place of some compartments at the beginning of the aisle to permit the operator to enter and leave the vehicle; in emergency he can make his way between the conveyor trays onto a steel escape ladder 48 attached to the vehicle. Suitable lighting 49 is provided on the operator's platform to illuminate the working area.

Several modes of operation of the basic installation are possible, for instance:

(1) The operator is provided with a replenishing list, made up in the most economical sequential order of co-ordinate travel, and he is constantly supplied with loads 42 in the same listed order by the conveyor 9. The operator manipulates the driving controls to position his platform conveniently in relation to the appropriate compartment and takes the load from the conveyor when it arrives, disposing of the empty box on the downward path of the conveyor. The conveyor speed can be increased or decreased by the operator to maintain a supply of loads without waste of time, and if a load passes too soon it can be picked up on the downward path or retrieved by driving the vehicle after it.

After all the replenishing has been done, the operator returns to the begining of the aisle and is now provided with an order-picking list, again made up in the most economical sequential order. The conveyor input is now supplied with empty boxes which the operator takes from the upward conveyor path, loads with a listed order item, and puts onto a downward tray to be taken to the packing bay.

(2) The operator is supplied with a combined replenishing and order-picking list made up in the most economical sequential order of travel, and differentiating between replenishing and picking by the colour of the entry; and loads 42 comprising replenishing goods and empty boxes (allowing for the boxes freed after replenishment) for picked items are automatically loaded in the same sequence onto the conveyor at 41. The operator is provided with a numbered push-button control which, on depression of the buttons corresponding to a required co-ordinate position and the subsequent pressing of the two safety buttons 29, will automatically traverse his platform to the position selected. The operator will thus replenish and pick continuously as he traverses the racking face from end to end.

(3) Two vehicles may be provided in the aisle, the conveyor passing over each in turn. The operator on the first vehicle receives loads for replenishing in sequence order, putting the emptied boxes onto the downward conveyor path to pass onto the second order-picking vehicle on which the operator uses the arriving empty boxes for picked items to be placed on the downward conveyor trays.

(4) A combined order-picking and replenishing sequence is established by a computer 50 which maintains a memory of goods in stock, the co-ordinate position of the compartment in which they are stored, the permitted maximum and minimum stock, and the number removed by previous order-picking; and is provided with details of the orders to be picked in a day's work. The computer provides a list of new stocks to be procured, and the loading sequence onto the conveyor at 41, including intermediate empty boxes for orders to be picked (and allowing for the re-use of boxes after replenishing items have been removed by the operator on the vehicle).

The operator moves his platform from position to position automatically by depression of the safety buttons 29 when he has completed an operation, the next co-ordinate position being determined and controlled by the computer 50 through the control wires 39 in the same sequence as the corresponding loads placed on the conveyor (though not at the same time). A digital display panel 51 on the operator's platform is at the same time energised under the control of the computer to show the part number of the next item, its compartment co-ordinates, the number off, and a code distinguishing between replenishing and picking; the operator is thus able to maintain a final check on the accuracy of the system.

Automatic collector means 52 may be provided for removing and storing loads from trays delivering to the platform 16, and may conveniently comprise a comb arranged on the downward path of the conveyor to retain the loads after they have been allowed to pass over the vehicle. Control means 53 actuated by the presence of load on the collector means may be connected through the control wires 39 to reduce the speed of the conveyor drive motor whilst one or more loads are in hand, thus approximating the speed of conveyor delivery to the speed of load placing. To dispose of boxes containing picked items, the operator may be provided with a chute 54 comprising an automatic loading mechanism to transfer the load to the next passing conveyor tray.

In the event of breakdown of the system, emergency access to stock can be maintained with the aid of light alloy ladders 55 arranged to run on the top rail 35 with deep-grooved rollers 56, and bear against a lower horizontal surface of the racking with rollers 57. Several ladders can be employed on either side of the stationary vehicle 1 to allow extra staff to handle sections of the store according to the work load. Temporary flooring suitable for load-collecting trolleys in the aisle may be provided by laying planks along the conveyor trays 12 from each end of the aisle up to the stationary vehicle 1.

What I claim is:

1. An order-picking installation comprising storage racking, guide means disposed longitudinally parallel to said racking and constraining a vehicle comprising a vertical structure and a load-handling carriage vertically movable in the structure, drive means operable to drive the vehicle along the guide means, conveyor means disposed longitudinally in the path of the vehicle and comprising a series of load carriers that pass continuously over said structure such that a load can be raised on a first side of the structure and lowered on a second side of the structure, means to transfer a load between a load carrier and the load-handling carriage, and means to transfer a load between the load-handling carriage and the storage racking.

2. An order-picking installation as claimed in claim 1 in which the guide means comprises a channel member with horizontal flanges, and the vehicle comprises supporting wheels vertically constrained between the flanges.

3. An order-picking installation as claimed in claim 1 in which the guide means comprises a channel member with horizontal flanges adapted to support the conveyor means.

4. An order-picking installation as claimed in claim 2 in which the guide means comprises a channel member and the storage racking is rigidly connected to the channel member.

5. An order-picking installation as claimed in claim 1 in which the guide means comprises a channel member recessed into the storage racking.

6. An order-picking installation as claimed in claim 1 in which the load-handling carriage is connected to a plurality of positionally synchronised lifting means together defining a plane movable in parallel relationship.

7. An order-picking installation as claimed in claim 1 in which the means to transfer a load between the load-handling carriage and the storage racking comprises an operator controlled by visual means displaying consecutively an order-picking sequence.

References Cited
UNITED STATES PATENTS

| | | | |
|---|---|---|---|
| 1,816,368 | 7/1931 | Fioruzzi | 214—16.4 |
| 1,927,677 | 9/1933 | Bennington | 214—16.4 |
| 2,634,869 | 4/1953 | Hicks | 214—16.4 |
| 2,664,216 | 12/1953 | Johnson et al. | 192—131 |
| 2,750,538 | 6/1956 | Saives | 192—131 |
| 2,780,368 | 2/1957 | Hickey et. al. | 198—186 |
| 3,219,207 | 1/1965 | Chasar | 214—16.4 |

FOREIGN PATENTS

| | | |
|---|---|---|
| 137,250 | 5/1950 | Australia. |
| 1,064,420 | 8/1959 | Germany. |

GERALD M. FORLENZA, *Primary Examiner.*

R. B. JOHNSON, *Assistant Examiner.*